United States Patent [19]

Giuffre et al.

[11] 4,060,473
[45] Nov. 29, 1977

[54] NOVEL COPOLYMERS AND DIAPHRAGMS MADE THEREFROM

[75] Inventors: Luigi Giuffre, Milan, Italy; Vittorio de Nora, Nassau, Bahamas; Placido Spaziante, Milan, Italy

[73] Assignee: Oronzio de Nora Impianti Elettrochimici S.p.A., Milan, Italy

[21] Appl. No.: 632,056

[22] Filed: Nov. 14, 1975

[30] Foreign Application Priority Data

Mar. 28, 1975 Italy .................................. 21810/75

[51] Int. Cl.² .......................... C25B 1/16; C25B 1/26; C25B 9/00
[52] U.S. Cl. ..................................... 204/253; 204/98; 204/128; 204/252; 204/258; 204/296; 260/2.2 R
[58] Field of Search ............. 260/29.6, 2.2 R, 87.5 A, 260/92.1, 79.3 M; 204/252, 128, 296, 98, 301; 117/62.1, 68, 94

[56] References Cited

U.S. PATENT DOCUMENTS

| | | | |
|---|---|---|---|
| 3,257,334 | 6/1966 | Chen et al. | 260/2.1 |
| 3,282,875 | 11/1966 | Connolly et al. | 260/29.6 |
| 3,718,627 | 2/1973 | Grot | 260/79.3 MU |
| 3,784,399 | 1/1974 | Grot | 117/62.1 |

Primary Examiner—Arthur C. Prescott
Attorney, Agent, or Firm—Hammond & Littell

[57] ABSTRACT

Novel sulfonated copolymers formed by copolymerization of a halogenated monomer containing at least one fluorine atom and a monomer of the formula

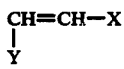

wherein X is an electron attracting group activating the hydrogen atom in the α-position so that the hydrogen may be replaced with a sulfonic group and Y is selected from the group consisting of hydrogen, methyl and ethyl and their preparation, novel diaphragms made therefrom, a diaphragm cell equipped with a diaphragm made of said sulfonated copolymer and to a method of electrolysis.

19 Claims, No Drawings

NOVEL COPOLYMERS AND DIAPHRAGMS MADE THEREFROM

STATE OF THE ART

In many electrolytic processes there is a need to separate the anolyte from the catholyte to keep separate the products of electrolysis which form respectively at the anode and at the cathode regions by provision of a separator capable of allowing ionic current to pass through while hindering or stopping completely the hydraulic flow of the electrolyte and of the products of electrolysis from the cathode compartment to the anode compartment and vice-versa.

For example according to one process for the production of chlorine, alkali metal chlorides are electrolyzed to produce chlorine and alkali metal hydroxide in a diaphragm cell. Such electrolytic cells have a structure substantially as shown in U.S. Pat. No. 3,337,443 and No. 3,022,244.

The diaphragm serves to separate the anolyte compartment from the catholyte compartment. An aqueous solution of an alkali metal chloride, i.e., brine, is fed into the anolyte compartment. In the anolyte compartment, the chloride ion of the disassociated alkali metal chloride forms chlorine at the anode. The anolyte liquor, including alkali metal ion, hydrogen ion, hydroxyl ion and chloride ion, travel through the diaphragm to the catholyte compartment. In the catholyte compartment, alkali metal hydroxide and gaseous hydrogen are liberated at the cathode, and catholyte liquor containing alkali metal chloride and alkali metal hydroxide is recovered from the catholyte compartment.

The diaphragm also serves to maintain a difference in pH between the two compartments. Typically, the electrolyte in the anolyte compartment will have a pH of from about 3.5 to about 4,5, while the electrolyte in the catholyte compartment will have a pH of up to 12.0 or greater. The diaphragm, in a typical electrolytic cell of the type hereinabove described, serves to maintain this difference in pH, while permitting the flow of electrolyte therethrough.

Typically, such diaphragm have been prepared from asbestos. In the electrolytic cells of the prior art, the asbestos has been of the type referred to in the literature as chrysotile asbestos. Crysotile asbestos has a structure characterized as tubular fibers, and an empirical formula of $3MgO \cdot 2SiO \cdot 2H_2O$.

Asbestos diaphragms generally have a weight of from about 0.30 to about 0.40 pounds per square foot of diaphragm surface area, a thickness of about one-eighth inch when installed and "swell" by about 100 percent to a thickness of about one-fourth inch when in service.

Such asbestos diaphragms of the prior art have a service life to about 4 months to about 7 months in electrolytic cell service where the anodes of the electrolytic cell are graphite. In the electrolytic cells wherein the anodes are dimensionally stable anodes (i.e., where the anodes are a metal substrate having an electrocatalytic metal or metal compound surface thereon), the service life of the diaphragm is typically from about 3 months to about 7 months. This contrasts with a service life typically in excess of 24 months for the dimensionally stable anodes themselves, thereby requiring several renewals of the asbestos diaphragm between each renewal of the anodes with consequent loss of production and expenses in diaphragm renewal.

A second negative aspect of asbestos diaphragms is represented by the fact that they swell considerably and in doing so they tend to fill completely the interelectrodic gap, sometimes contacting the anode over large areas. The diaphragms are therefore subjected to strong erosion by the rising anodic gas bubbles and also the cell voltage is increased.

A third negative characteristic of asbestos diaphragms is represented by the fact that asbestos is substantially nonselective with respect to ions. Therefore, under the same external parameters such as the sizes and mobilities of the various species of ions, the gradient of concentration and the difference in pressure between the two compartments, the diaphragm is equally permeable both to anions and to cations. An ideal diaphragm should instead be perfectly permeable to alkali metal cations and represent a barrier to the migration of $OH^-$ anions from the catholyte into the anolyte.

Several proposals have been recently made to substitute the conventional asbestos diaphragm with other porous materials having improved mechanical and electrochemical characteristics or with permionic membranes substantially impermeable to the electrolyte.

Polytetrafluoroethylene is one material having the thermal and chemical inertness even at elevated temperatures which would make it suitable for use as a diaphragm in diaphragm cells but the polymer is not water-wettable and is not wet by aqueous electrolytes. This lack of wettability prevents the polymer from being used as a diaphragm and various measures have been tried to make the said polymer water-wettable.

U.S. Pat. No. 3,702,267 describes polytetrafluoroethylene containing 20 to 95% of inorganic particulate solids with a particle diameter not greater than 0.2 microns, a bulk density of not more than 0.25 $g/cm^3$ and a specific surface area of at least 20 $m^2/gm$ but the said polymer is difficult to produce in a uniform manner and has other unsatisfactory characteristic. U.S. Pat. No. 3,853,720 describes asbestos containing 1 to 5% of a second fiber material of special characteristics and 0.01 to 22% of a fluorocarbon resin such as polytetrafluoroethylene. A third solution is described in U.S. Pat. No. 3,853,721 wherein asbestos fibers are impregnated with 0.01 to 22% of a fluorocarbon resin such as polytetrafluoroethylene. Each of these solutions has various defects and they do not provide an economical or technologically simple answer to the problem of providing a synthetic material with thermal, chemical and mechanical resistance properties similar to polytetrafluoroethylene while being suitable per se as diaphragm material with the necessary requisites of wettability, mechanical stability and ion-selectively.

OBJECTS OF THE INVENTION

It is an object of the invention to provide a novel sulfonated copolymer of a halogenated monomer containing at least one fluorine atom and a monomer of the formula $Y-CH=CH-X$ which is water-wettable and insoluble in aqueous solutions.

It is another object of the invention to provide a novel process for the preparation of the said sulfonated copolymer.

It is a further object of the invention to provide a novel diaphragm for electrolysis cells and to a diaphragm cell equipped with said sulfonated copolymer as the diaphragm.

It is an additional object of the invention to provide a novel process for the electrolysis of alkali metal chlorides to form chlorine and alkali metal hydroxides.

It is a further object of the invention to provide novel intermediate copolymers.

These and other objects and advantages of the invention will become obvious from the following detailed description.

THE INVENTION

The novel copolymers of the invention are a sulfonated copolymer of (A) a monomer of the formula $$Y-CH=CH-X \qquad \text{I}$$

wherein X is an electron attracting group and Y is selected from the group consisting of hydrogen, methyl and ethyl and (B) a fluorinated monomer of the formula

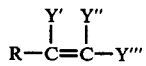

$$\text{II}$$

wherein R is selected from the group consisting of hydrogen, halogen and alkyl of 1 to 4 carbon atoms optionally halogenated and Y', Y" and Y'" are individually selected from the group consisting of hydrogen and halogen with the proviso that at least one of the Y's is fluorine.

Examples of suitable groups for X are —COOH, CONH₂, —COOR' where R' is lower alkyl of 1 to 7 carbon atoms, —COX' wherein X' is a halogen such as chlorine, —CN. Examples of specific compounds are acrylic acid, crotonic acid, acrylic acid chloride, vinyl acetate, acrylonitrile, acrylamide, etc.

Examples of suitable fluorinated monomers of formula II are tetrafluoroethylene, chlorotrifluoroethylene, bromotrifluoroethylene, vinylfluoride, vinylidenefluoride and hexafluoropropylene, etc. One of the preferred copolymers is a copolymer of acrylic acid and tetrafluoroethylene.

After copolymerization of the halogenated monomer and the monomer having at least one hydrogen atom α to the electron attractor group, the intermediate copolymers which are also a part of the invention are sulfonated which results in a polymer material having strongly negative polar characteristics, excellent mechanical and chemical stability and good wettability by aqueous electrolytes. The polymers are particularly suitable for use as diaphragm material in electrolysis cells, particularly for the electrolysis of aqueous alkali metal halide solutions. The strongly negative groups within the copolymer oppose the back migration of hydroxyl ions from the cathode compartment to the anode compartment.

In the copolymers of the invention, the molar ratio of the monomer having at least one hydrogen atom α to the electron attracting group to the halogenated monomer is selected so that the sulfonated copolymer has the required wettability and negative polarity while retaining the desired mechanical and chemical stability. The said molar ratio of halogenated monomer to monomer of formula II may be between 2.5:1 to 42:1, preferably 7:1 to 25:1. The molecular weight of the sulfonated copolymer is between $2\times10^4$ to $4\times10^6$, preferably $2\times10^5$ to $2\times10^6$.

The novel process of the invention for the preparation of the sulfonated copolymer comprises copolymerizing (A) a vinyl monomer of the formula $$Y-CH=CH-X \qquad \text{I}$$

wherein X and Y have the above definitions and (B) a halogenated monomer of the formula

$$\text{II}$$

wherein R is selected from the group consisting of hydrogen, halogen and alkyl of 1 to 4 carbon atoms optionally halogenated, Y', Y" and Y'" are individually selected from the group consisting of hydrogen and halogen with the proviso that at least one of the Y's is fluorine and sulfonating the resulting copolymer to replace the hydrogen on the carbon atom α to the carboxyl with the —SO₃H group. The said replaceable hydrogen atom is labile due to the presence of the electron attractor group and is therefore easily substituted.

The polymerization is preferably effected in the presence of a polymerization initiator such as benzoyl peroxide or ammonium persulfate and at elevated temperatures of 50° to 150° C, preferably 65° to 130° C. Preferably water is present in the reaction mixture and the reaction is effected under pressure of up to 18 atmospheres. The speed of reaction is high at elevated temperatures and pressures and therefore, the probability of obtaining alternating sequences of the two monomers in the copolymer is increased. The degree of sulfonation may vary but is between 60 to 100% replacement of the hydrogen atoms on the carbon atom α to the carboxyl group.

A preferred mode of the invention comprises copolymerizing tetrafluoroethylene and acrylic acid in a molar ratio of 7:1 to 25:1 to obtain a copolymer of the formula

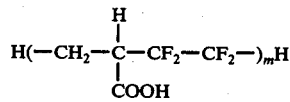

and the resulting copolymer is sulfonated to obtain a copolymer in which 60 to 100% of the hydrogen atoms on the carbon alpha to the carboxyl group are replaced by —SO₃H groups.

A simple manner of operation comprises introducing an acrylic acid aqueous solution and initiator into the reactor and introducing tetrafluoroethylene under pressure and then heating the reaction mixture until the reaction is complete as indicated by a lack of any further decrease in pressure in the reactor. The copolymer is preferably sulfonated with sulfur trioxide in liquid sulfur dioxide at a temperature lower than −10° C but the sulfonation may also be effected with gaseous sulfur trioxide, preferably diluted in an inert gas current such as anhydrous nitrogen.

Once sulfonation has taken place, the sulfonic groups introduced into the copolymer are stabilized by adding small quantities of water to the sulfonation solution or water vapor to the gaseous sulfonation mixture. The stabilization of the sulfonic groups of the copolymer consists of the transformation of the —SO₃H group linked to the copolymer into the —SO₃H₃O⁺ group. In such a form, the sulfonic group can no longer give rise to microreversibility reactions which inevitably provoke destructive redox processes. For this reason, the quantity of $H_2O$ to be added after sulfonation is only the stochiometric one, or a quantity which is just over.

Sulfonated copolymers can be formed into thin sheets suitable for use as permionic membranes by known methods for the preparation of sheets of p.t.f.e. This procedure comprises the preparation of a doughly mass of powder of the sulfonated copolymer with a suitable dispersant additive such as water, ethyl alcohol, methyl alcohol, etc., or mixtures of the same; forming thin sheets by means of lamination, removing the dispersant additive under heat, then pressing and heating the sheets to a temperature between 200° and 300° C. The sheets may be cut to the required shape and size for their use in a diaphragm cell.

The sulfonated copolymers of the invention may be treated to obtain films having different physical characteristics by certain fabrication procedures. In particular, powders having a suitable grain size of materials that are soluble in suitable solvents such as powders of metals or metal oxides such as aluminum, magnesium oxide etc., may be introduced into the doughy mass before molding. After molding, the film is treated with a suitable solvent to make the material soluble. It is possible in this way to make a diaphragm with a uniform porosity and which is perfectly wettable. In certain applications, such material represents an alternative to the use of permionic membranes which are not permeable to the electrolyte.

The novel electrolysis method of the invention comprises electrolyzing an aqueous solution of an alkali metal chloride in an interelectrodic gap between an anode and a cathode with a diaphragm separating the cathode compartment from the anode compartment prepared from the sulfonated copolymer of the invention. The diaphragm maintains the good characteristics of the polytetrafluoroethylene such as insolubility in caustic solutions, resistance to conditions existing in the electrolysis cell and dimensional stability while it overcomes the disadvantages of polytetrafluoroethylene by being wettable by aqueous electrolytes. Moreover, the presence of strongly negative polar groups in its structure opposes the backward diffusion or migration of $OH^-$ ions across the diaphragm. The electrolysis conditions, such as current density, concentration of the electrolyte, temperature etc. are those which are normally found in traditional diaphragm cells for the production of chlorine.

In the following examples there are described several preferred embodiments to illustrate the invention. However, it should be understood that the invention is not intended to be limited to the specific embodiments.

EXAMPLE 1

A solution of 4.028 g of acrylic acid and 0.8 g of ammonium persulfate in 300 ml of water was added to a liter glass autoclave provided with a water-circulating heating sleeve connected to a thermostat and a mechanical stirrer. The autoclave was flushed with nitrogen and a vacuum was applied thereto. Tetrafluoroethylene was passed through a column of sodium hydroxide to remove traces of hydrofluoric acid and was then added to the autoclave until a pressure of 3.9 ATA at 17° C was obtained. The temperature of the reactor was then raised to 75° C with constant stirring and after 8 hours, the tetrafluoroethylene pressure had fallen to 1 ATA and 11 g of a water-insoluble polymer were obtained. Analysis of the polymer showed it to be a copolymer of tetrafluoroethylene and acrylic acid in a molar ratio of 13:1.

The water-insoluble copolymer was added to a 150 ml glass reactor provided with dry ice cooled acetone circulating sleeve, a mechanical stirrer and a dripping apparatus provided with a cooling sleeve. 50 ml of liquid sulfur dioxide cooled to $-30°$ C were added to the reactor as solvent and 50 ml of liquid sulfur dioxide and 0.5 ml of sulfur trioxide cooled to $-30°$ C were added to the dripping apparatus. The solution of sulfur trioxide in sulfur dioxide was then added dropwise to the reactor with stirring over a period of 20 minutes and the temperature was raised to $-10°$ C. This temperature was maintained for 30 minutes and then 1 ml of water was added to the reaction mixture to stabilize the sulfonic acid group introduced into the copolymer on the carbon atom alpha to the carboxyl group. The liquid sulfur dioxide was evaporated and the sulfonated copolymer was washed with water until the wash waters were neutral. Analysis of the copolymer showed a tetrafluoroethylene-acrylic acid-sulfonic acid molar ratio of 13:1:1.

EXAMPLE 2

The procedure of Example 1 was repeated except that 9.4 g of acrylic acid was used and the water insoluble copolymer had a tetrafluoroethylene-acrylic acid molar ratio of 8:1. The said copolymer was then sulfonated as in Example 1.

EXAMPLE 3

The procedure of Example 1 was repeated with 6.032 g of acrylic acid and the water-insoluble copolymer was then sulfonated as in Example 1 except the reaction time was 15 minutes. Analysis of the copolymer showed a tetrafluoroethyleneacrylic acid-sulfonic acid molar ratio of 10:1:0.8.

EXAMPLE 4

1 gm of sulfonated copolymer of tetrafluoroethylene and acrylic acid having a tetrafluoroethylene-acrylic acid-sulfonic acid molar ratio of 13:1:0.95 prepared according to the procedure of Example 1 was formed into a thin film with a thickness of about 0.3 mm by pressing and heating to 275° C a copolymer powder having a mesh number ranging from 300 to 400. A sample of said film 50 mm × 50 mm was used as a separator between the cathode and the anode of a laboratory test cell. The test conditions and the cell operation data as determined after about 2 hours from start-up are reported below:

| | |
|---|---|
| Brine concentration as fed to the anode compartment | 310 g/l NaCl |
| Anode | Titanium substrate with a catalytic coating of mixed oxides of ruthenium and titanium |
| Cathode | Low carbon steel mesh |
| Current density with respect to the membrane surface | 1000 A/m² |
| Hydrostatic head across membrane. | 20 cm. |
| Electrolyte temperature | 80° C |
| Average concentration of anolyte | 250 g/l of NaCl (maintained constant by circulating resaturated brine in the anode compartment) |

| | |
|---|---|
| Cell voltage measured at the electrodes | 3.5 Volts |
| Catholyte composition: | |
| NaOH | 285 g/l |
| NaCl | 5 g/l |
| Chlorates | 0.5 to 1 g/l |
| Faraday efficiency | 86% |

EXAMPLE 5

A solution of 0.2g of crotonic acid and 0.22g of benzoyl peroxide in 300 ml of water was introduced into a glass autoclave provided with a water-circulating heating sleeve connected to a thermostat and a mechanical stirrer. The autoclave was flushed with nitrogen and a vacuum was applied thereto. Gaseous chlorotrifluoroethylene was introduced into the autoclave until a pressure of 3 ATA at 17° C was obtained. The temperature of the reactor was then raised to 60° C with constant stirring and immediate dissolution of the gas in the solvent was noticed.

After 12 hours, the autoclave was emptied and after evaporation of the solvent 4.2 grams of copolymer were recovered. Analysis of the copolymer showed it to be a copolymer of chlorotrifluoroethylene and crotonic acid in a molar ratio of 13:1. The copolymer was sulfonated according to the same method described in Example 1. The analysis showed a molar ratio between chlorotrifluoroethylene-crotonic acid-sulfonic acid of 13:1:1.

EXAMPLE 6

About one gram of powder of the sulfonated copolymer of chlorotrifluoroethylene and crotonic acid of Example 5 was formed into a thin film with a thickness of about 0.25 mm by pressing and heating to 275° C. A sample of said film was used as a separator between the cathode and the anode of a laboratory test cell. The test conditions and the cell operation data as determined after about 2 hours from start-up are reported below:

| | |
|---|---|
| Brine concentration as fed to the anode compartment | 310 g/l NaCl |
| Anode | Titanium substrate with a catlaytic coating of mixed oxides of ruthenium and titanium |
| Cathode | Low carbon steel mesh |
| Current density with respect to the membrane surface | 1000 A/m² |
| Hydrostatic head across membrane | 20 cm. |
| Electrolyte temperature | 80° C |
| Average concentration of anolyte | 250 g/l of NaCl (maintained constant by circulating resaturated brine in the anode compartment) |
| Cell voltage measured at the electrodes | 3.5 Volts |
| Catholyte composition: | |
| NaOH | 270 g/l |
| NaCl | 6.5 g/l |
| Chlorates | 0.5 to 1 g/l |
| Faraday efficiency | 85% |

Various modifications of the products and processes of the invention may be made without departing from the spirit or scope thereof and it is to be understood that the invention is to be limited only as defined in the appended claims.

We claim:

1. A diaphragm for an electrolysis cell comprising a film made of water-wettable and water-insoluble at least 60% sulfonated copolymer of (A) a monomer of the formula $$Y-CH=CH-X$$

wherein X is an electron attracting group and Y is selected from the group consisting of hydrogen, methyl and ethyl and (B) a halogenated monomer of the formula $$R-C(Y')=C(Y'')-Y'''$$

wherein R is selected from the group consisting of hydrogen, halogen and alkyl of 1 to 4 carbon atoms optionally halogenated, Y', Y'' and Y''' are individually selected from the group consisting of hydrogen and halogen with the proviso that at least one of the Y's is fluorine and the sulfonic acid group is attached to the carbon atom α to the electron attracting group, the ratio of B to A being 1:2.5 to 1:42.

2. The diaphragm of claim 1 wherein the halogenated monomer is selected from the group consisting of tetrafluoroethylene, chlorotrifluoroethylene, bromotrifluoroethylene, vinylidenefluoride and hexafluoropropylene.

3. The diaphragm of claim 1 wherein the electron-attracting group is selected from the group consisting of —COOH, —COOR', —CN, —CONH₂ and —COX' X' is a halogen and R' is lower alkyl.

4. The diaphragm of claim 1 wherein the halogenated monomer is tetrafluoroethylene and the co-monomer is acrylic acid.

5. The diaphragm of claim 4 wherein the molar ratio between tetrafluoroethylene and acrylic acid is between 7:1 and 25:1.

6. The diaphragm of claim 5 wherein the molar ratio between acrylic acid and sulfonic acid is between 1:0.6 and 1:1.

7. The diaphragm of claim 1 wherein the molecular weight of the sulfonated copolymer is between $2\times10^4$ and $4\times10^6$.

8. In a diaphragm cell comprising a plurality of anodes and cathodes and diaphragms separating each anode compartment from the corresponding cathode compartment, the improvement comprising using as the diaphragm a diaphragm of claim 1.

9. The cell of claim 8 wherein the halogenated monomer is selected from the group consisting of tetrafluoroethylene, chlorotrifluoroethylene, bromotrifluoroethylene, vinylidenefluoride and hexafluoropropylene.

10. The cell of claim 8 wherein the electron-attracting group is selected from the group consisting of —COOH, —COOR', —CN, —CONH₂ and —COX' X' is a halogen and R' is lower alkyl.

11. The cell of claim 8 wherein the halogenated monomer is tetrafluoroethylene and the co-monomer is acrylic acid.

12. The cell of claim 11 wherein the molar ratio between tetrafluoroethylene and acrylic acid is between 7:1 and 25:1.

13. The cell of claim 12 wherein the molar ratio between acrylic acid and sulfonic acid is between 1:0.6 and 1:1.

14. The cell of claim 1 wherein the halogen monomer is selected from the group consisting of tetrafluoroethylene, chlorotrifluoroethylene, bromotrifluoroethylene, vinylidenefluoride and hexafluoropropylene.

15. The cell of claim 1 wherein the electron-attracting group is selected from the group consisting of —COOH, —COOR', —CN, —CONH$_2$ and —COX', X' is a halogen and R' is lower alkyl.

16. The cell of claim 1 wherein the halogenated monomer is tetrafluoroethylene and the co-monomer is acrylic acid.

17. The cell of claim 16 wherein the molar ratio between tetrafluoroethylene and acrylic acid is between 7:1 and 25:1.

18. The cell of claim 17 wherein the molar ratio between acrylic acid and sulfonic acid is between 1:0.6 and 1:1.

19. In the method of electrolyzing an aqueous alkali metal chloride in a diaphragm type cell comprising at least an anode, a cathode and a diaphragm separating the anode compartment from the cathode compartment, the improvement comprising using as the diaphragm a diaphragm of claim 1.

* * * * *